Oct. 20, 1936.  W. H. PEADEN ET AL  2,058,100
SPREADER FOR TIRE CASINGS AND THE LIKE
Filed Oct. 31, 1935
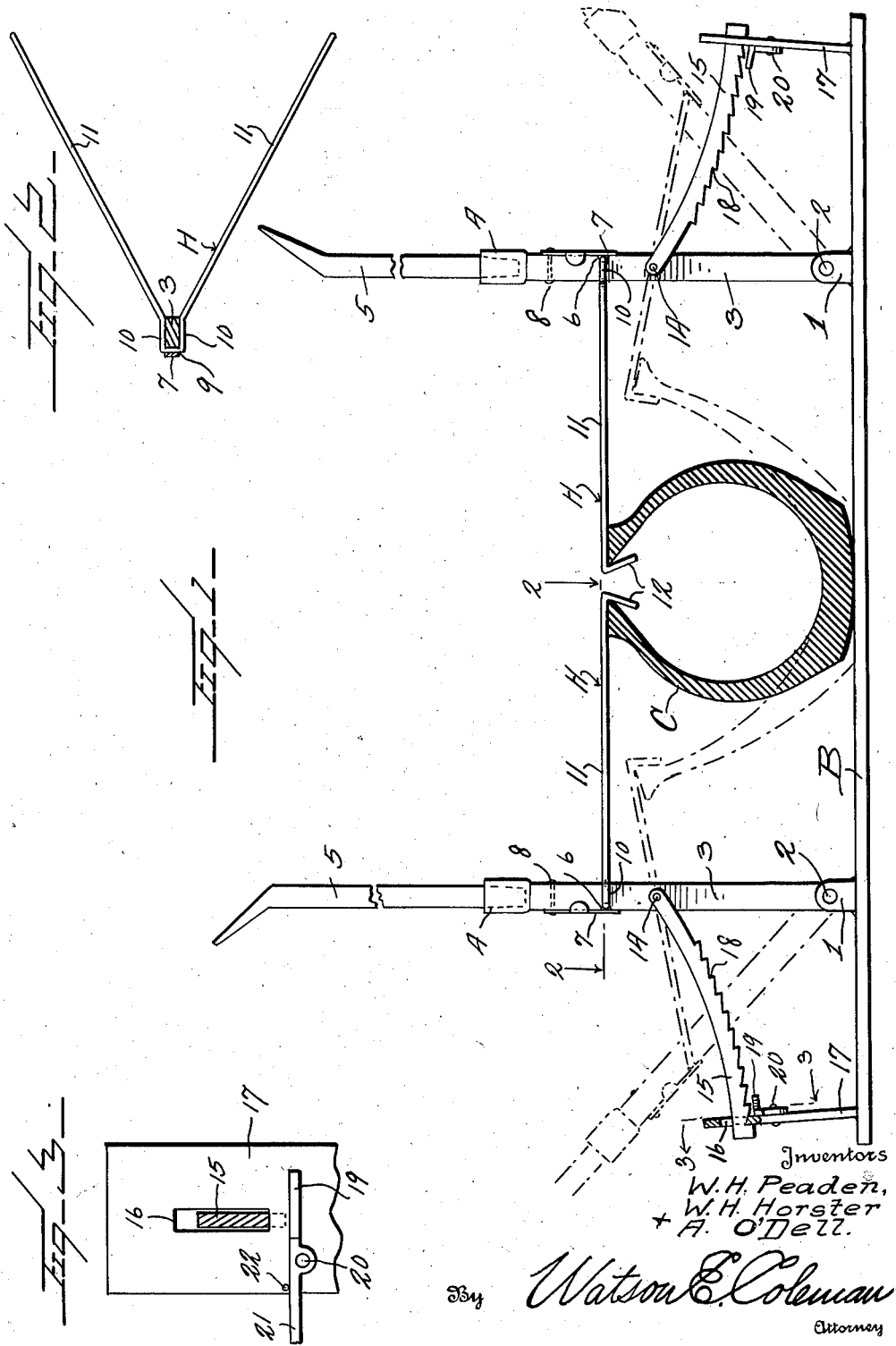

Patented Oct. 20, 1936

2,058,100

UNITED STATES PATENT OFFICE 2,058,100

SPREADER FOR TIRE CASINGS AND THE LIKE

William H. Peaden, William H. Horster, and Arthur O'Dell, Tulsa, Okla., assignors to Tire Tools, Inc., a corporation of Oklahoma Application October 31, 1935, Serial No. 47,700

4 Claims. (Cl. 152—27)

This invention relates to spreaders for tire casings and the like, and it is primarily an object of the invention to provide a device of this kind which is especially designed and adapted for use in inspecting or repairing tire casings.

It is also an object of the invention to provide a device or apparatus of this kind whereby the desired spreading of the casing may be effected with but little effort on the part of the operator, together with means for effectively maintaining the casing in its spread or open position.

The invention consists in the details of construction and in the combination and arrangement of the several parts of our improved spreader for tire casings and the like whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a view in side elevation and of somewhat a diagrammatic character with portions broken away illustrating a spreader constructed in accordance with an embodiment of our invention, a second position of certain of the parts being indicated by broken lines;

Figure 2 is a fragmentary sectional view taken substantially on the line 2—2 of Figure 1 with the tire casing omitted;

Figure 3 is a fragmentary sectional view taken substantially on the line 3—3 of Figure 1 and on an enlarged scale.

As disclosed in the accompanying drawing, B denotes a base of desired dimensions and material and which is provided at suitably spaced points with the upstanding ears or lugs 1 to which are pivoted, as at 2, the lower end portions of the levers 3. Each of these levers is of desired length and is provided at its upper or free end portion with a socket 4 with which a handle member 5 may be detachably engaged and which is particularly desirable in obtaining increased leverage. This handle member 5 in itself constitutes a tool which is particularly adapted for use in removing a tire casing from its rim. The outer edge face of each of the levers 3 in its upper portion is provided with a notch 6 which is normally closed by a spring latch 7. This latch 7 is held to the lever 3 by a bolt 8 or the like.

Received within the notch 6 is a short cross member 9 connecting the outer extremities of the relatively short parallel arms 10 which are in continuation of the inner extremities of the elongated diverging arms 11 of a spreader hook H. These arms 11 have their outer or free extremities provided with the depending bills or lugs 12 to engage with a side wall of a tire casing C and more particularly an inner bead thereof. The arms 10 have close contact with the adjacent side faces of a lever 3 so that the spreader hook H in its entirety may be maintained in a raised or elevated position and which is particularly desired when placing the casing C in desired position for spreading between the levers 3.

With the hooks H properly engaged with the applied casing C an outward pull upon the levers 3 and preferably through the handle members 5, results in an effective spreading of the casing C as is believed to be clearly indicated by broken lines in Figure 1 of the accompanying drawing.

It is, of course, important and necessary that the casing C be maintained in spread adjustment to permit the desired inspection or repair and for this purpose each of the levers 3 has pivotally connected to its upper portion, as at 14, an end portion of an elongated arcuate ratchet bar 15. This bar 15 extends outwardly from its lever 3 and is freely disposed through a slot or opening 16 provided in the upper part of an upstanding plate 17 rigidly secured by welding or otherwise as may be preferred to the base 1. The teeth 18 of the ratchet bar 15 are provided along the lower edge of said bar 15 and coact with the portion of the plate 17 adjacent the lower end of the opening or slot 16, said slot or opening 16 being of a length to permit free and unobstructed movement of the bar 15 through the plate 17 when pull is imposed upon the associated lever 3 to spread the casing C.

This ratchet bar 15 operates by gravity to provide an automatic means for locking its associated lever 3 in its various positions and in order to release the ratchet bar 15 to permit return swinging movement of the lever 3, a bar or lifting member 19 is pivotally connected, as at 20, to the plate 17 at a point below the opening or slot 16 so that upon upward swinging movement of the bar or lifting member 19 the ratchet member 15 will be raised into released position to allow return movement of the lever 3. The pivoted end portion of the bar or lifting member 19 is continued by a foot piece 21 which extends to one side of the plate 17 so that the same may be readily engaged by the foot of the operator when it is desired to release the ratchet bar 15. The lifting member 19 as particularly illustrated in Figure 1 is relatively broad so as not to interlock with the ratchet teeth 18 and said lifting member or bar 19 normally maintains by gravity its inoperative position as illustrated in Figure 3, such position being determined as illustrated in Figure 3 by contact of the foot piece 21 with a stop 22 such as a pin extending outwardly from the adjacent face of the plate 17.

From the foregoing description it is thought to be obvious that a spreader for tire casings and the like constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. A tire casing spreader comprising a pair of levers having notches in the outer edge faces thereof, means for supporting said levers for swinging movement, spreader hooks, each of said spreader hooks being substantially V-shaped in form, the apex portion of each of said spreader hooks being formed to provide relatively short parallel arms for close contact with the adjacent side faces of a lever and with a short cross member connecting the outer extremities of the short parallel arms, said cross member seating within a notch of a lever.

2. A tire casing spreader comprising a pair of levers having notches in the outer edge faces thereof, means for supporting said levers for swinging movement, spreader hooks, each of said spreader hooks being substantially V-shaped in form, the apex portion of each of said spreader hooks being formed to provide relatively short parallel arms for close contact with the adjacent side faces of a lever and with a short cross member connecting the outer extremities of the short parallel arms, said cross member seating within a notch of a lever, and means carried by the levers for holding the arms of the spreader hooks within notches of the levers.

3. A tire casing spreader comprising a pair of levers having notches in the outer edge faces thereof, means for supporting said levers for swinging movement, spreader hooks, each of said spreader hooks being substantially V-shaped in form, the apex portion of each of said spreader hooks being formed to provide relatively short parallel arms for close contact with the adjacent side faces of a lever and with a short cross member connecting the outer extremities of the short parallel arms, said cross member seating within a notch of a lever, and means carried by the levers for holding the arms of the spreader hooks within notches of the levers, said last named means comprising spring latches.

4. A tire casing spreader comprising a base, a pair of upstanding levers, means for pivotally mounting the lower extremities of said levers upon the base at spaced points, a spreader hook operatively engaged with each of the levers, an elongated ratchet member pivotally connected with each of the levers and extending outwardly therefrom, upstanding plates mounted upon the base outwardly of the levers, a single plate being associated with each lever, each plate having an opening through which is freely directed the ratchet member pivotally connected to the adjacent lever, the teeth of the ratchet member coacting with the plate to hold the lever against return movement after being pulled in a direction to spread the casing, a bar associated with each plate, means for pivotally connecting an intermediate portion of the bar to the plate at a point below and to one side of the opening in the plate so that upon upward swinging movement of one end portion of the bar the adjacent ratchet member will be released from the plate, the portion of the bar contacting with the ratchet member being of sufficient width to avoid interlocking with the teeth of the ratchet member and to give sufficient weight to said end portion of the bar to normally maintain the same in its lowered position, the opposite end portion of the bar constituting an operating element.

WILLIAM H. PEADEN.
WILLIAM H. HORSTER.
ARTHUR O'DELL.